(12) United States Patent
Jones

(10) Patent No.: US 6,712,316 B2
(45) Date of Patent: Mar. 30, 2004

(54) SNAP-ON SIDEWALL ASSEMBLY

(75) Inventor: Gary E. Jones, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/210,312

(22) Filed: Aug. 1, 2002

(65) Prior Publication Data
US 2004/0021039 A1 Feb. 5, 2004

(51) Int. Cl.[7] .................................................. B64C 1/12
(52) U.S. Cl. ..................... 244/132; 244/131; 244/129.4
(58) Field of Search ........................... 244/118.1, 118.2, 244/118.5, 118.6, 129.4, 131

(56) References Cited

U.S. PATENT DOCUMENTS

| | | | | | |
|---|---|---|---|---|---|
| 2,118,561 | A | * | 5/1938 | Kleeberg ..................... | 411/338 |
| 2,219,714 | A | | 10/1940 | Sperry | |
| 3,110,068 | A | * | 11/1963 | Perrochat ..................... | 24/297 |
| 3,381,438 | A | | 5/1968 | Bohnsack | |
| 3,832,820 | A | * | 9/1974 | Eggert ..................... | 52/506.08 |
| 4,050,208 | A | * | 9/1977 | Pompei et al. ................. | 52/460 |
| 4,067,155 | A | * | 1/1978 | Ruff et al. ..................... | 52/105 |
| 4,739,955 | A | * | 4/1988 | Aquino et al. ............ | 244/129.4 |
| 4,828,202 | A | * | 5/1989 | Jacobs et al. ............ | 244/117 R |
| 4,878,795 | A | * | 11/1989 | Woodrow et al. ........... | 411/501 |
| 5,014,934 | A | * | 5/1991 | McClaflin ................... | 244/132 |
| 5,044,578 | A | * | 9/1991 | White et al. ................ | 244/119 |
| 5,065,960 | A | * | 11/1991 | Castellucci ................. | 244/131 |
| 5,230,485 | A | * | 7/1993 | Vogg et al. ............... | 244/118.2 |
| 5,520,357 | A | * | 5/1996 | Payne et al. ............. | 244/118.1 |
| 5,553,368 | A | * | 9/1996 | Barry ........................... | 29/423 |
| 5,695,154 | A | * | 12/1997 | Castellucci et al. .......... | 244/130 |
| 5,944,286 | A | * | 8/1999 | Morris et al. ................ | 244/131 |
| 6,010,094 | A | * | 1/2000 | Csik et al. ................ | 244/129.1 |
| 6,029,933 | A | * | 2/2000 | Holman et al. ........... | 244/118.5 |
| 6,042,296 | A | | 3/2000 | Wittig et al. | |
| 6,068,214 | A | * | 5/2000 | Kook et al. .............. | 244/118.1 |
| 6,086,018 | A | * | 7/2000 | Gobeil et al. ........... | 244/122 R |
| 6,199,798 | B1 | * | 3/2001 | Stephan et al. .......... | 244/129.4 |
| 6,227,491 | B1 | | 5/2001 | Stephan et al. | |
| 6,435,455 | B1 | * | 8/2002 | Holman et al. .......... | 244/118.5 |
| 6,572,304 | B1 | * | 6/2003 | Hessling et al. ............. | 403/321 |

FOREIGN PATENT DOCUMENTS

| | | | | |
|---|---|---|---|---|
| DE | 4215843 A1 | * | 11/1993 | ............. B64C/7/00 |
| EP | 0303102 | * | 7/1988 | ............. F16J/15/00 |
| WO | WO 80/02254 | * | 10/1980 | ............. B32B/7/08 |

* cited by examiner

Primary Examiner—Charles T. Jordan
Assistant Examiner—Stephen A. Holzen
(74) Attorney, Agent, or Firm—Ann K. Galbraith

(57) ABSTRACT

A snap-on sidewall assembly is provided for attachment to an airframe of an aircraft. The snap-on sidewall assembly includes an outer rail member that has a mounting portion for attachment to the airframe. The outer rail member has at least one recess integrally formed therein and at least one outer support flange extending from the recess. Each recess is adapted for engaging at least one protrusion integrally formed within an inner rail member. The integral inner rail member further includes at least one inner support flange extending from the protrusion. Finally, the snap-on sidewall assembly includes at least one sidewall panel. Each sidewall panel has an end portion that is, intended to be sandwiched between one of the outer support flanges and one of the inner support flanges.

16 Claims, 2 Drawing Sheets

SNAP-ON SIDEWALL ASSEMBLY

TECHNICAL FIELD

The present invention relates generally to sidewall panels, and more particularly to snap-on sidewall assemblies for enhancing fabrication of sidewall panels and improving installation on airframes.

BACKGROUND OF THE INVENTION

Aircraft manufacturers typically construct aircrafts with three layers of thermal-acoustic insulation for protecting the passenger cabin from fire and undesired noise. In most cases, these layers include an outer aluminum skin, an intermediate fiberglass batting, and an inner shell. Typically, the inner shell comprises a combination of sidewall panels and cabin flooring mounted on the airframe. Of course, it is understood that aircrafts may have a variety of other configurations and comprise various other materials.

Typical sidewall panels employ tab and slot fasteners in combination with bonding adhesives for attachment to the airframe of an aircraft. Manufacturers are ordinarily required to form the fasteners within precise locations on each sidewall panel for allowing proper installation of the sidewall panel on the airframe. In doing so, manufacturers usually employ clamping tools and marking instruments for constructing the sidewall panels within the desired tolerances. As a result, fabrication of the sidewall panel assemblies is somewhat cumbersome thereby increasing manufacturing cycle time and costs associated therewith. Such a result is obviously undesirable.

In addition, despite the combination of fasteners and bonding adhesives, existing sidewall panels may propagate beyond a desired position on the airframe. As a result, the sidewalls may require frequent readjustment to the desired position. This sort of continuous maintenance is undesired.

Other types of sidewall assemblies employs multiple-piece attachment hardware. For example, one assembly includes a base member for attachment to an airframe. A holding clip may be used to sandwich end portions of two sidewall panels between the base member and the holding clip. This assembly may be secured together by a separate fastener, such as a screw fastener or spring clip.

One drawback of these assemblies is that the use of separate fasteners makes installation of the sidewall panel assemblies somewhat cumbersome. Ordinarily, these fasteners are relatively small and, therefore, can be easily lost or misplaced. Consequently, containers of various kinds are usually employed for holding these fasteners. These containers typically represent additional equipment necessary to construct an aircraft. Handling this additional equipment may increase manufacturing cycle time and costs associated therewith. Therefore, although the containers reduce the burden in transporting and storing the fasteners, the usage of containers poses additional problems. Moreover, the relatively small fasteners may still be lost or mishandled when they are withdrawn from the containers.

It would therefore be desirable to provide a simply designed sidewall panel assembly with relatively few parts that can be easily manufactured and installed onto an airframe in a manner that reduces the need for future repositioning.

SUMMARY OF THE INVENTION

It is therefore an object of the present invention to provide a snap-on sidewall assembly having a simple structure with a minimal number of parts for permitting easy manufacture thereof.

It is yet another object of the present invention to provide a snap-on sidewall assembly having a simple structure for allowing easy installation onto an airframe.

It is still another object of the present invention to provide a snap-on sidewall assembly that remains fixed in a desired position on an airframe.

In accordance with the above and other objects of the present invention, a snap-on sidewall assembly is provided for attachment to an airframe of an aircraft. The snap-on sidewall assembly includes an outer rail member that has a mounting surface for attachment to the airframe. The outer rail member has at least one recess integrally formed therein and at least one outer support flange extending from the recess. Each recess is adapted for engaging at least one protrusion integrally formed within an integral inner rail member. The integral inner rail member further includes at least one inner support flange extending from the protrusion. Finally, the snap-on sidewall assembly includes at least one sidewall panel. Each sidewall panel has an end portion that is intended to be sandwiched between one of the outer support flanges and one of the inner support flanges.

One advantage of the present invention is that the snap-on sidewall assembly has an uncomplicated structure that allows for decreased manufacturing cycle time and decreased costs associated therewith.

Another advantage of the present invention is that the snap-on sidewall assembly has a simple structure for allowing relatively quick and uncomplicated installation onto an airframe.

Yet another advantage of the present invention is that the snap-on sidewall assembly remains substantially fixed in a desired position thereby decreasing the need for future maintenance and repositioning.

Other advantages of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
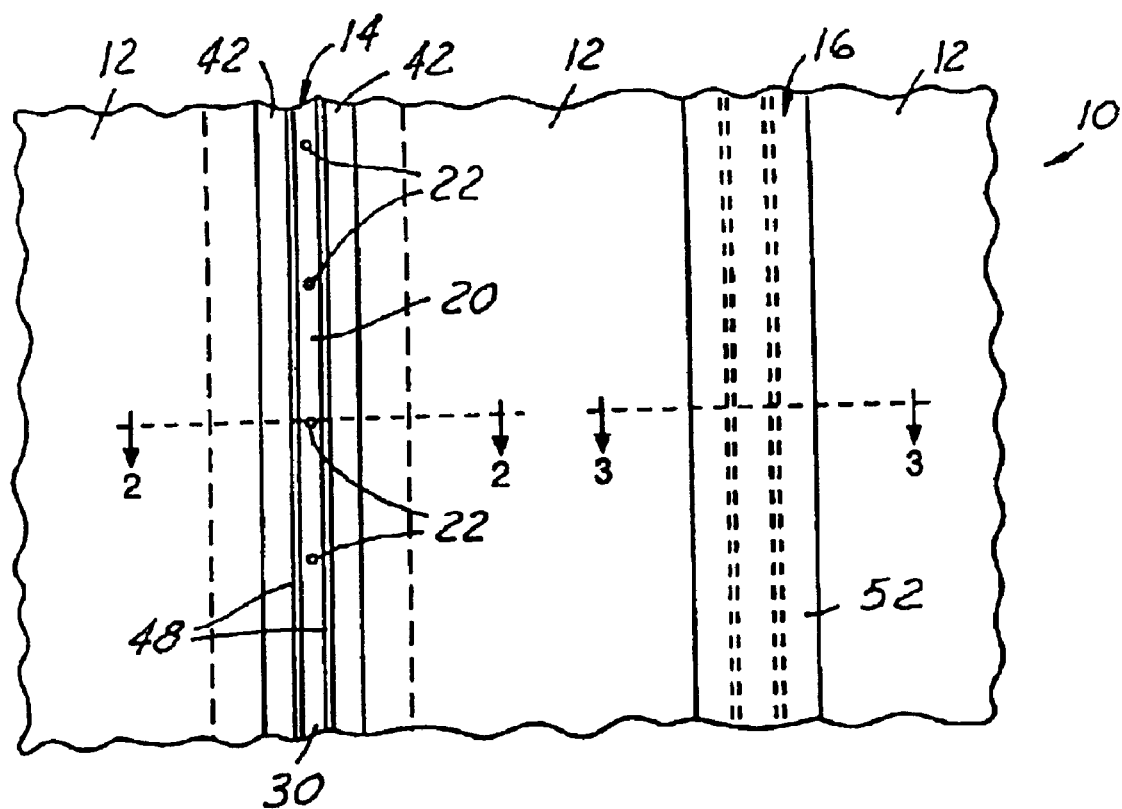
FIG. 1 is an elevation view of a section of an inner shell of an aircraft representing the present invention and illustrating the different steps in installing a snap-on sidewall assembly, according to a preferred embodiment of the present invention.

In the following figures the same reference numerals will be used to illustrate the same components in the various views. The present invention is particularly suited for installation on airframes of aircrafts. However, it is understood that the present invention may be utilized for a variety of vehicles or structures that include panel sections for dividing one space from another space.

Figure 2:
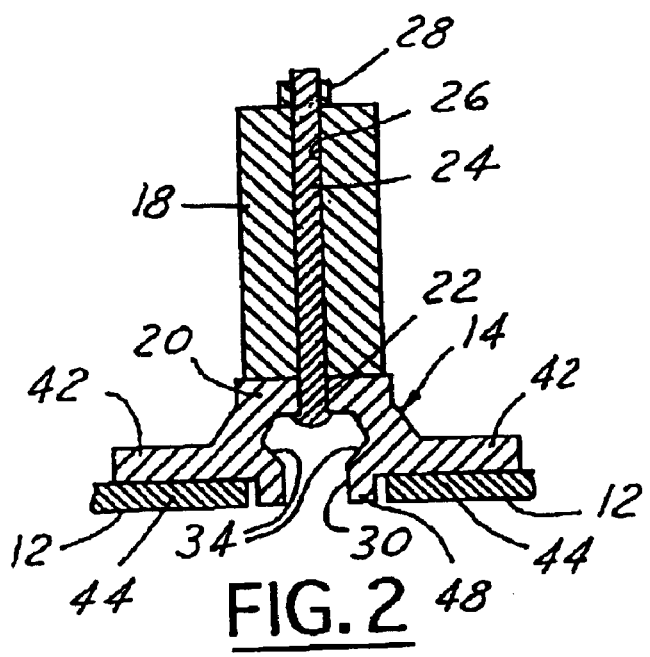
FIG. 2 is cross-sectional view of a section of an inner shell of an aircraft, as shown in FIG. 1 and taken along line 2—2.
Figure 3:
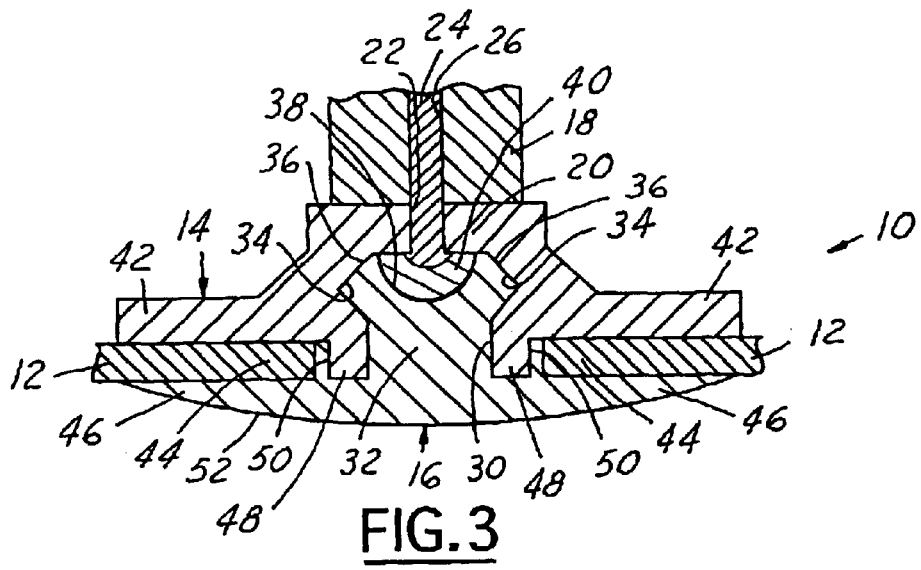
FIG. 3 is cross-sectional view of the snap-on sidewall assembly as shown in FIG. 1, taken along line 3—3.

With general reference to FIGS. 1 through 3, a snap-on sidewall assembly 10 preferably includes two sidewall panels 12 secured in place and sandwiched between an outer rail member 14 and an integral inner rail member 16. The outer rail member 14 is preferably secured to an isolator mount 18 of an airframe and alternatively secured to a support member of a various other structures. Although the usage of two sidewall panels 12 is disclosed, it is understood that one or more sidewall panels may be utilized instead.

Referring now to FIGS. 1 and 2, a snap-on sidewall assembly 10 includes an outer rail member 14 for attachment to an isolator mount 18 of an airframe. The outer rail member 14 preferably has a mounting portion 20 with one or more holes 22 formed therein for receiving a plurality of bolt fasteners 24. The bolt fasteners 24 extend through these holes 22 and at least one aperture 26 formed through the isolator mount 18. A series of nut fasteners 28 engage the bolt fasteners 24 so as to secure the outer rail member 14 to the airframe. It is understood that these bolt and nut fasteners 24, 28 exemplify only one type of fastener pair that may be used for attaching the outer rail member 14 to the airframe.

Furthermore, referring now primarily to FIG. 3, each outer rail member 14 preferably defines a groove 30 along its longitudinal axis in a manner that allows for a snap-fit connection between the outer rail member 14 and an integral inner rail member 16. This groove 30 preferably has a suitable shape for receiving and engaging a protruded rail 32 which extends from and is an integral part of the integral inner rail member 16. In this respect, the groove 30 preferably includes a pair of ruts 34 for receiving and engaging a pair of ridges 36 extending from the protruded rail 32. Of course, various other structures may be utilized for creating a snap-fit engagement.

The protruded rail 32 preferably has a channel 38 integrally formed therein for receiving and storing a thermal-acoustic insulation element 40 between the outer rail member 14 and the integral inner rail member 16. This thermal-acoustic insulation element 40 preferably is a fiberglass batting and alternatively may be any other suitable material that insulates against undesired thermal and acoustical transmissions. Such insulation is particularly beneficial in protecting the passenger cabin of an aircraft from wind and engine noise during travel, as well as from fire dangers in the event of an accident. In this respect, the outer rail member 14 and the integral inner rail member 16 are preferably comprised of fire-resistant material for protection against substantially high temperatures.

Furthermore, as one skilled in the art will understand, providing integral single-piece rail members 14, 16 may increase the efficiency of insulating against undesired temperature and noise conditions. By the very characteristics of an integral single-piece structure, the integral inner rail member 16 eliminates the need for a separate fastener by including the fastener as an integral part of its structure. In doing so, there exist less chances for separation between the pieces and consequently less opportunities for relatively unimpeded transmission of heat and noise from a space external to the sidewall panels 12 to a space internal to the sidewall panels 12.

Moreover, a person skilled in the art will also understand that reducing the number of parts in a sidewall assembly may also decrease manufacturing cycle time of the entire assembly 10, installation time of the assembly 10 on the airframe, and any costs associated therewith.

Although the above description details a snap-fit engagement between a groove 30 and a protruded rail 32, a person skilled in the art will understand that various other suitable structures may allow for a snap-fit connection between the outer rail member 14 and the integral inner rail member 16. For instance, the snap-fit engagement between the groove 30 and the protruded rail 32 may be substituted with a snap-fit engagement between one or more recesses formed within the outer rail member 14 and one or more protrusions that extend from and are integral parts of the integral inner rail member 16.

Referring again to FIG. 3, the outer rail member 14 preferably has two outer support flanges 42 extending from the groove 30 for the purpose of contacting the outer surfaces of the end portions 44 of each sidewall panel 12. Likewise, the integral inner rail member 16 preferably includes inner support flanges 46 extending from the protruded rail 32 for the purpose of contacting the inner surfaces of the end portions 44 of the sidewall panels 12. In this regard, engaging the protruded rail 32 of the inner rail member 16 to the groove 30 of the outer rail member 14 sandwiches the end portions 44 of the sidewall panels 12 between the outer support flanges 42 and the inner support flanges 46 thereby securing the sidewall panels 12 on the airframe of the aircraft.

Preferably, the outer rail member 14 also includes two outer lateral detents 48 extending from the groove 30 for preventing adjacent sidewall panels 12 from propagating toward a centerline of the snap-on sidewall assembly 10. Moreover, the integral inner rail member 16 also includes two inner lateral detents 50 extending from the protruded rail 32 for further securing the sidewall panels 12 in a relatively fixed lateral position. Although two outer lateral detents 48 and two inner lateral detents 50 are described, it is understood that any number of these detents 48, 50 may be utilized, e.g. none, one, or a plurality thereof.

The integral inner rail member 16 also includes a finishing surface 52 that conceals the adjoining end portions 44 of the sidewall panels 12. This surface 50 is preferably contoured in an aesthetically pleasing manner or alternatively in any other desired configuration.

Figure 4:
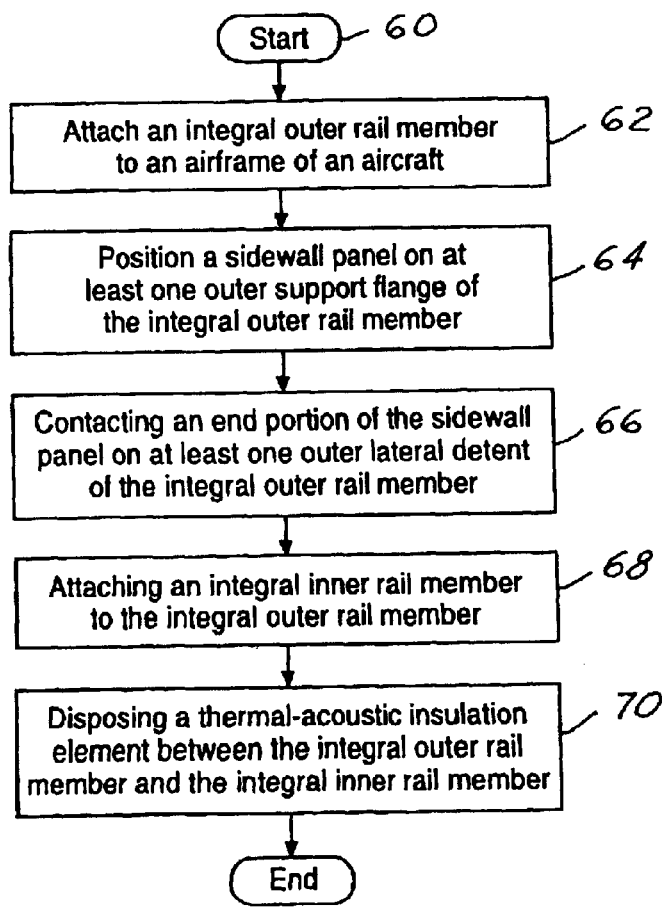
FIG. 4 is a flowchart depicting a method for installing a snap-on sidewall panel assembly according to a preferred embodiment of the present invention.

Referring now to FIG. 4, there is shown a flowchart depicting a method for installing a snap-on sidewall assembly 10, according to a preferred embodiment of the present invention. The method commences at step 60 and immediately proceeds to step 62.

In step 62, an outer rail member 14 is attached to the airframe of an aircraft. This step is preferably accomplished by inserting a bolt fastener 24 through one or more holes 22 formed within a mounting portion 20 of the outer rail member 14 and then subsequently through one or more apertures 26 formed through an isolator mount 18 of the airframe. A nut fastener 28 is preferably threadably engaged to the bolt fastener 24 so as to secure the outer rail member 14 to a desired position on the airframe. However, a person skilled in the art will understand that a variety of other suitable methods may be utilized for attaching the outer rail member 14 to the airframe. The sequence then proceeds to step 64.

In step 64, an end portion 44 of at least one sidewall panel 12 is positioned on at least one outer support flange 42 extending from the outer rail member 14. In performing this step, the sidewall panel 12 is preferably placed in a desired position for creating a section of a wall, such as the inner shell of an aircraft. Then, the sequence proceeds to step 66.

In step 66, each sidewall panel 12 is preferably positioned on the integral outer support flange 42 so as to operatively contact the end portion of the sidewall panel 12 to an outer lateral detent 48 extending from the outer rail member 14. In performing this step, the outer lateral detent 48 prevents the sidewall panel 12 from propagating beyond a desired position toward a centerline of the sidewall assembly 10. The sequence then proceeds to step 68.

In step 68, an integral inner rail member 16 is attached to the outer rail member 14. This step is preferably accomplished by engaging a protruded rail 32, which is an integral part of the integral inner rail member 16, to a groove 30 formed within the outer rail member 14. In doing so, the end portions 44 of the sidewall panels 12 are sandwiched between the outer support flanges 42 and one or more inner support flanges 46 extending from the protruded rail 32 of the integral inner rail member 16. Of course, the integral inner rail member 16 may instead be attached to the outer rail member 14 by employing a snap-fit engagement between one or more protrusions integrally formed within the integral inner rail member 16 and one or more recesses integrally formed within the outer rail member 14. The sequence then proceeds to step 70.

In step 70, a thermal-acoustic insulation element 40 is disposed within a channel 38 integrally formed within the protruded rail 32 so as to provide temperature and noise barrier between the exterior of the sidewall panels 12 and the interior of the sidewall panels 12. This step is preferably accomplished by injecting a fiberglass batting into the channel 38 after the integral inner rail member 16 is attached to the outer rail member 14. Of course, the thermal-acoustic insulation element 40 may be disposed between the inner and outer rail members 14, 16 by variety of other methods at other times during the sequence.

While particular embodiments of the invention have been shown and described, numerous variations and alternate embodiments will occur to those skilled in the art. Accordingly, it is intended that the invention be limited only in terms of the appended claims.

What is claimed is:

1. A snap-on sidewall assembly for attachment to an airframe of an aircraft, the snap-on sidewall assembly comprising:

an outer rail member having a mounting surface for attachment to the airframe, said outer rail member defining at least one recess and at least one outer support flange extending from said at least one recess, said at least one recess being a continuous groove integrally formed within said outer rail member;

an integral inner rail member having at least one protrusion integrally formed therein for engaging said at least one recess of said outer rail member, said integral inner rail member further including at least one inner support flange extending from said at least one protrusion, said integral inner rail member further including a finishing surface for concealing said at least one protrusion; and at least one sidewall panel having an end portion intended to be sandwiched between said at least one outer support flange and said at least one inner support flange, said end portion being covered by said finishing surface of said integral inner rail member;

wherein said at least one protrusion is a protruded rail member extending from said inner rail member, said protruded rail member including a channel integrally formed therein for receiving a thermal-acoustic insulation element.

2. The snap-on sidewall assembly of claim 1 further comprising:

a thermal-acoustic insulation element disposed between said outer rail member and said inner rail member.

3. The snap-on sidewall assembly of claim 2 wherein said thermal-acoustic insulation element is a fiberglass batting.

4. The snap-on sidewall assembly of claim 1 wherein at least one of said outer rail member, said inner rail member, said first sidewall panel, and said second sidewall panel is comprised of a fire-resistant material.

5. A snap-on sidewall assembly for attachment to an airframe of an aircraft, the snap-on sidewall a assembly comprising:

an outer rail member having a mounting portion for attachment to the airframe, said outer rail member further including at least one outer support flange extending from said mounting portion, at least one outer lateral detent disposed adjacent to said at least one outer support flange, and at least one recess integrated within said outer rail member;

an integral inner rail member having at least one protrusion integrated therein for engaging said at least one recess, said integral inner rail member further including at least one inner support flange intended to operatively engage said outer support flange; and at least one sidewall panel having an end portion intended to be sandwiched between said at least one outer support flange and said at least one inner support flange, said end portion also intended to be engaged by said at least one outer lateral detent for preventing movement of said at least one sidewall panel towards a centerline of the snap-on sidewall assembly.

6. The snap-on sidewall assembly of claim 5 wherein said integral inner rail member includes at least one inner lateral detent disposed adjacent to said at least one inner support flange, said at least one inner lateral detent intended to prevent movement of said at least one sidewall panel towards a centerline of the snap-on sidewall assembly.

7. The snap-on sidewall assembly of claim 5 further comprising:

a thermal-acoustic insulation element disposed between said outer rail member and said inner rail member.

8. The snap-on sidewall assembly of claim 7 wherein said thermal-acoustic insulation element is a fiberglass batting.

9. The snap-on sidewall assembly of claim 5 wherein said at least one recess is a continuous groove integrally formed within said outer rail member.

10. The snap-on sidewall assembly of claim 9 wherein said at least one protrusion is a protruded rail member extending from said inner rail member.

11. The snap-on sidewall assembly of claim 10 wherein said protruded rail member includes a channel integrally formed therein, said channel intended to receive a thermal-acoustic insulation element.

12. The snap-on sidewall assembly of claim 5 wherein said outer rail member, said inner rail member, said first sidewall panel, and said second sidewall panel are comprised of a fire-resistant material.

13. A method for installing a sidewall panel onto an airframe of an aircraft, the method comprising:

mounting a mounting portion of an outer rail member to the airframe, said outer rail member defining at least one recess and having at least one outer support flange extending from said mounting portion;

positioning an end portion of at least one sidewall panel on said at least one outer support flange;

contacting said end portion of said at least one sidewall panel to at least one lateral detent extending from said outer rail member; and connecting at least one protrusion integrated within an integral inner rail member to said at least one recess of said outer rail member.

14. The method of claim 13 wherein said connecting said at least one protrusion to said at least one recess comprises:

sandwiching said end portion of said at least one sidewall panel between said at least one outer support flange of said outer rail member and at least one inner flange of said inner rail member.

15. The method of claim 13 further comprising;

disposing a thermal-acoustic insulation element between said outer rail member and said inner rail member.

16. The method of claim 13 wherein said outer rail member, said inner rail member, said at least one sidewall panel is comprised of a fire-resistant material.

* * * * *